United States Patent [19]
Ott

[11] Patent Number: 5,933,557
[45] Date of Patent: Aug. 3, 1999

[54] MULTI-LINK BOOT ASSEMBLY FOR CABLE CONNECTOR

[75] Inventor: Michael J. Ott, Taylorsville, N.C.

[73] Assignee: Siecor Corporation, Hickory, N.C.

[21] Appl. No.: 08/752,080

[22] Filed: Nov. 19, 1996

[51] Int. Cl.⁶ .............................. G02B 6/00; G02B 6/36
[52] U.S. Cl. .............................................................. 385/86
[58] Field of Search ....................... 385/86, 87, 100–113, 385/76, 134, 136; 174/69, 135, 68.3, 136, DIG. 12; 285/114, 115; 439/445, 446, 448

[56] References Cited

U.S. PATENT DOCUMENTS

| | | | |
|---|---|---|---|
| 4,367,967 | 1/1983 | Albert, Jr. | 174/135 X |
| 4,703,135 | 10/1987 | Magnani et al. | 174/135 |
| 5,094,552 | 3/1992 | Monroe et al. | 385/76 |
| 5,138,678 | 8/1992 | Briggs et al. | 385/86 |
| 5,170,452 | 12/1992 | Ott | 385/60 |
| 5,340,330 | 8/1994 | Dolson et al. | 439/447 |
| 5,390,272 | 2/1995 | Repta et al. | 385/100 |
| 5,473,723 | 12/1995 | Stockman et al. | 385/86 |

*Primary Examiner*—Akm E. Ullah

[57] ABSTRACT

A multi-link boot assembly has a number of separate links which can be connected to form a flexible boot assembly capable of maintaining a predetermined bend radius as off-axial loads are applied, thereby effectively dispersing stresses along a cable as the cable is flexed or bent. Each link of the multi-link boot assembly includes a body portion defining a lengthwise extending bore for receiving the cable. The body portion extends between first and second opposed ends and generally includes a female section at the first end and a male section at the second end. The female section defines an opening for receiving the male section of another link during the assembly of the multi-link boot assembly. In order to connect each link with another link to form the flexible boot assembly, each link includes a connecting element at each of the first and second opposed ends which cooperably engages a corresponding connecting element of an adjacent link. As a result of the mechanical interconnection of the links of the multi-link boot assembly, the multi-link boot assembly will permit the cable to readily bend or flex until the predetermined minimum bend radius of the cable is reached, at which point the boot assembly will prevent further bending of the cable even in instances in which increased off-axial loads are applied to the cable.

17 Claims, 4 Drawing Sheets

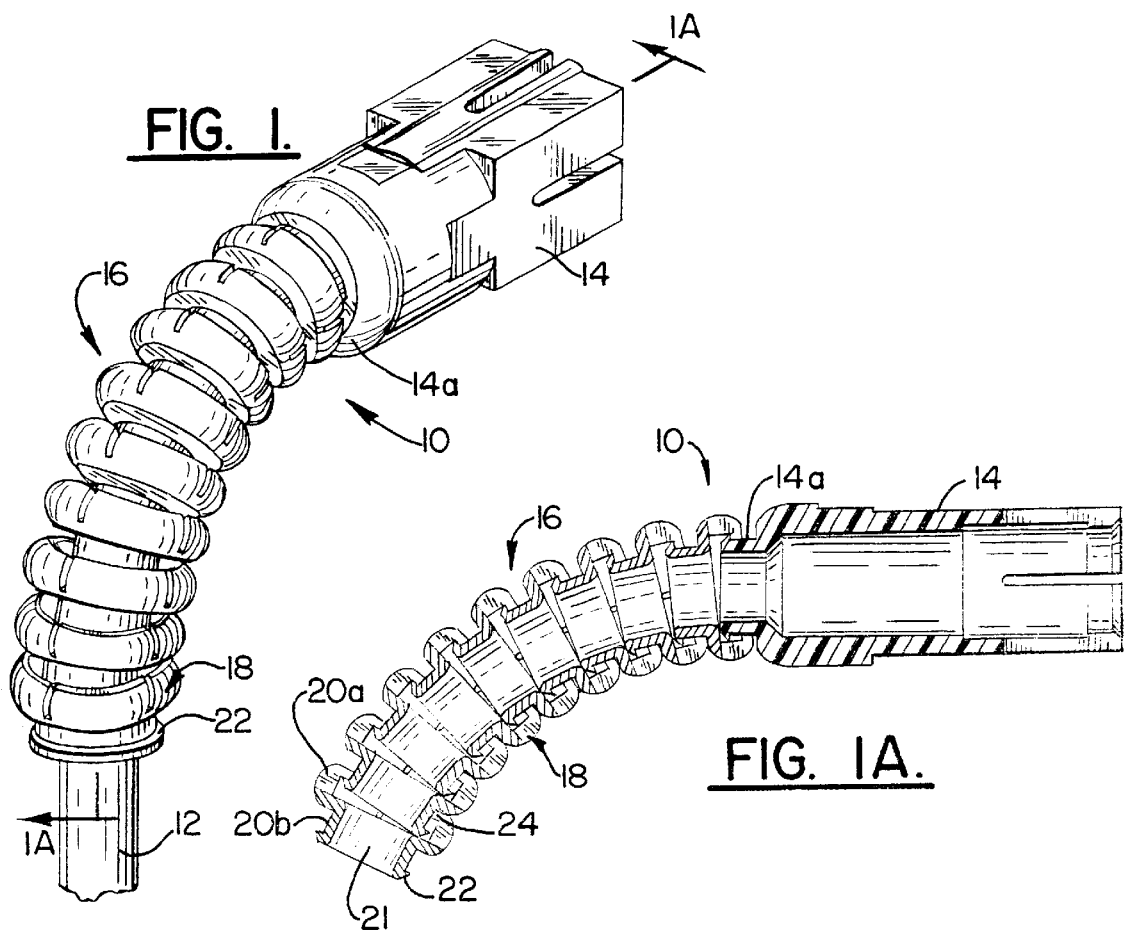
FIG. 1.
FIG. 1A.
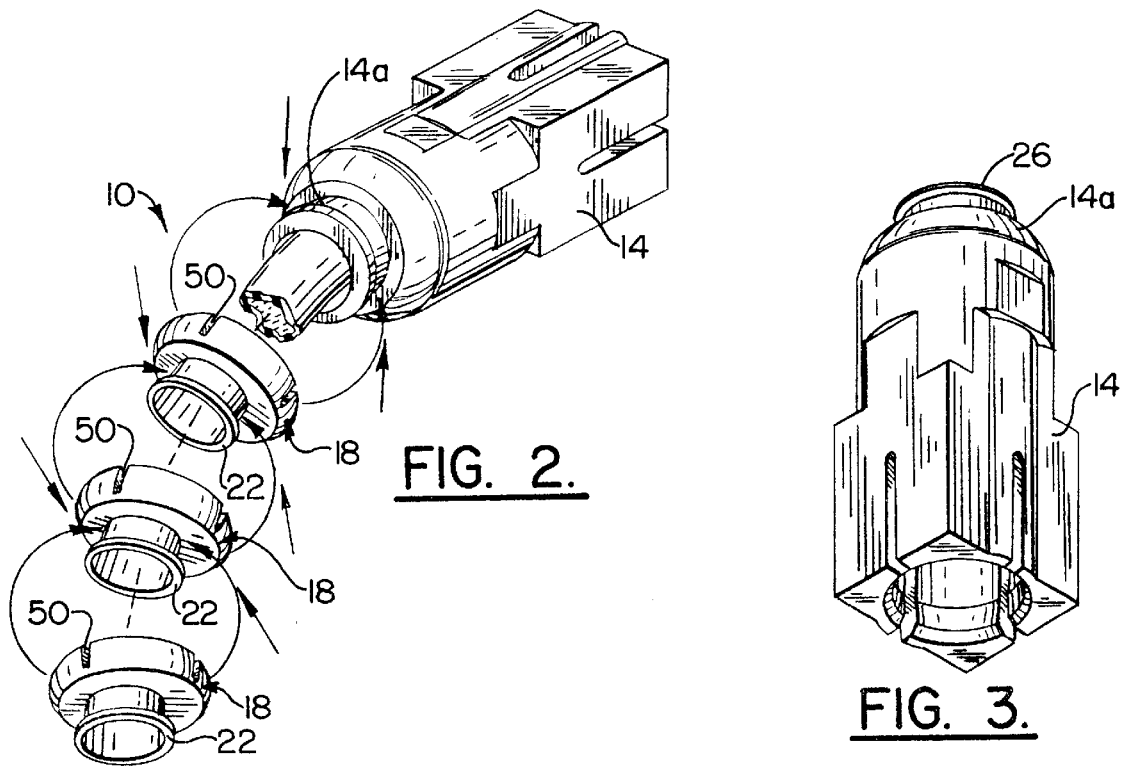
FIG. 2.
FIG. 3.

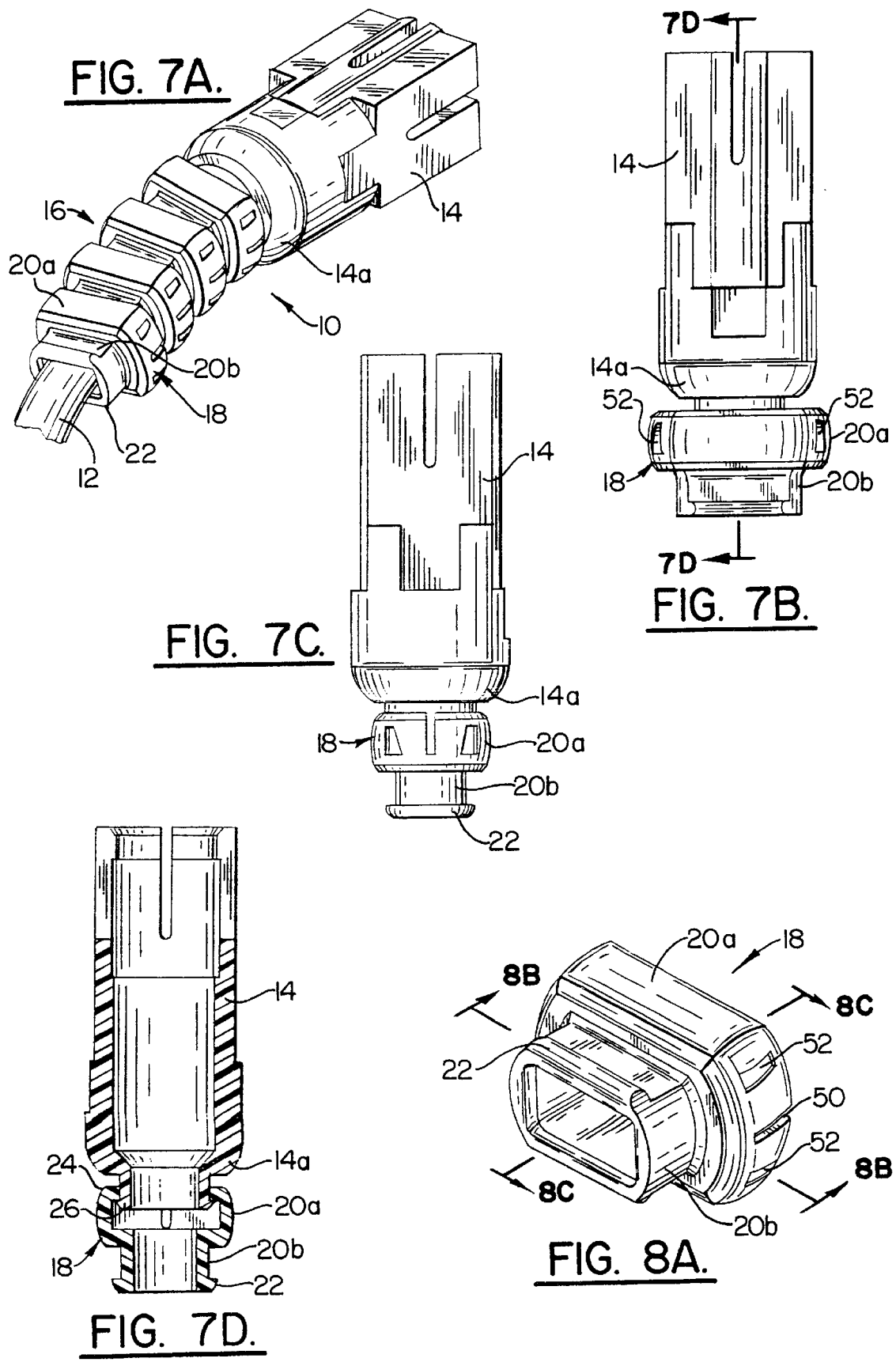

MULTI-LINK BOOT ASSEMBLY FOR CABLE CONNECTOR

BACKGROUND OF THE INVENTION

The present invention relates generally to cable connectors, and more particularly, a multi-link boot assembly for a cable connector.

Cables, such as fiber optic cables and electrical cables, are commonly terminated by a connector. For example, a fiber optic cable may be terminated with a connector which couples or connects the optical fibers, such as to other optical fibers, to a patch panel in a telephone central office or in an office building or to various remote terminals or pedestals. In order to facilitate the connection or termination of the cable, a number of standardized connectors have been developed, such as SC, FC, ST and D4 connectors. These standardized connectors provide predetermined types of connector interfaces such that the connector or other type of terminal to which the standardized connector will be coupled can be appropriately designed to mate with the standardized connector.

Cables are generally relatively flexible and may be bent significantly both during and following installation. While some bending or flexing is necessary, the flexing of a cable creates stress on the cable. For a cable terminated with a connector, the stress imparted by flexing of the cable will generally stress imparted by flexing of the cable will generally be concentrated on the portion of the cable which extends from the rear portion of the connector since this portion of the cable may be bent quite sharply. As known to those skilled in the art, the cable and, in particular, the electrical conductors or the optical fibers disposed within the cable will tend to degrade or fail as the cable is subjected to multiple cycles of stress. The degradation or failure of the cable generally occurs in those portions of the cable which are subjected to the greatest stresses, namely, the portion of the cable which extends from the rear portion of the connector.

For data grade copper cables subject to multiple cycles of stress, the resistivity, inductance and capacitance of the conductor pairs within the cable will be degraded, thereby adversely effecting the data rate at which the cable can transmit data. Similarly, as fiber optic cables are bent more sharply, the optical fibers will attenuate the optical signals to a greater degree. In this regard, single mode optical fibers transmitting optical signals having a wavelength at or near 1550 nanometers are quite sensitive to bending of the optical fibers and tend to significantly attenuate of the optical signals as they are bent.

In order to disperse the stresses which are otherwise concentrated on the portion of the cable extending from the rear portion of the connector, connector boots have been developed. Connector boots are generally mounted on or over the connector housing and extend rearwardly from the connector housing so as to protect the cable as the cable flexes or moves relative to the connector housing. A number of different boots have been designed for use with both fiber optic and electrical cables. Typically, these boots are comprised of a single molded component. In order to protect the cable and to disperse the stresses imparted by bending of the cable, a number of conventional boots have been formed of different materials with different combinations of material properties, such as different Young's modulus, durometer and yield strength. In order to further protect the cable by dispersing stresses along the cable, conventional boots have incorporated a number of different design features, such as windows of different shapes and sizes, different wall thicknesses and lengths, and different overall shapes, such as boots having a spiral or tapered shape.

In order to effectively protect the cable from excessive stresses while permitting the necessary bending of the cable, a connector boot should flex readily as off-axis loads are applied until the minimum bend radius of the cable is reached, at which point the boot should prevent further bending of the cable even if the off-axis load is increased. Notwithstanding the different material properties and the different design features, conventional boots do not readily meet these design objectives. In particular, conventional boots which prevent the cable from bending beyond the minimum bend radius even as large off-axial loads are applied to the cable will generally be relatively stiff and inflexible at lighter loads. As a result, these boots may cause the portion of cable which extends from the rear end of the boot to bend sharply, thereby creating increased levels of stress on this portion of the cable. Conversely, conventional boots which yield readily to permit flexing of cables at lighter off-axis loads also generally permit the cable to be bent beyond the minimum bend radius.

Accordingly, even though a number of conventional boots are available for dispersing the stresses imposed on the cable in the vicinity of a connector, no single connector boot has been developed which simultaneously meets the various design objectives. As a result, a cable terminated with a conventional connector and boot assembly may still be subjected to acceptably large concentrations of stress as the cable is bent or flexed, thereby degrading the cable's performance or limiting the cable's lifetime.

SUMMARY OF THE INVENTION

It is therefore an object of the present invention to provide an improved boot assembly for dispersing stresses along a cable.

It is another object of the present invention to provide a boot assembly which readily flexes as the cable is bent to the predetermined minimum bend radius and which prevents the cable from bending beyond the predetermined minimum bend radius even if large off-axial loads are applied to the cable.

These and other objects are provided, according to the present invention, by a multi-link boot assembly having a number of separate links and an engagement member for operatively engaging the links such that adjacent links and the engagement member cooperate to provide a positive stop for preventing further relative angular motion once the adjacent links are offset by a predetermined angle. As a result, the multi-link boot assembly is capable of maintaining a predetermined bend radius as off-axial loads are applied. By including a number of separate links which are operatively engaged by an engagement member to form the multi-link boot assembly, the boot assembly of the present invention is flexible under all loading conditions, but prevents bending or flexing of the cable beyond the predetermined minimum bend radius, even if large off-axial loads are applied to the cable. As a result, the multi-link boot assembly of the present invention effectively disperses stresses along the cable as the cable is flexed or bent so as to prevent undesirable concentrations of stress, such as on those portions of the cable which extend beyond the rear portion of a connector.

Each link of the multi-link boot assembly of the present invention includes a body portion defining a lengthwise extending bore for receiving the cable. The body portion of one advantageous embodiment extends between first and second opposed ends and includes a female section at the first end and a male section at the second end. The female section defines an opening for receiving the male section of another link. The female section can also include at least one cut-out which opens through the first end to allow the female section to deform for mating with the male section of another link.

According to one advantageous embodiment, the engagement member includes a connecting element at each of the first and second opposed ends of each link to connect each link with another link to thereby form the flexible boot assembly. According to one advantageous embodiment, the connecting element of the male section of each link includes a circumferential collar that extends outwardly therefrom. According to this embodiment, the connecting element of the female section of each link preferably includes a circumferential lip extending at least partly into the opening defined by the female section. As a result, the circumferential lip of the female section of a first link can engage the circumferential collar of the male portion of the second link, thereby securely connecting the first and second links to form at least a portion of the flexible boot assembly.

According to another advantageous embodiment, the connecting element of each link includes at least one arm extending outwardly from one end of the link and at least one outwardly extending post adjacent the other end of the link. According to this embodiment, the outwardly extending arm of a first link can engage a respective post of a second link to thereby connect the first and second links to form at least a portion of the flexible boot assembly.

According to another advantageous embodiment, the engagement member includes a sleeve which holds the plurality of separate links in a predetermined serial order. The sleeve is at least partially flexible since it is preferably fabricated of a material which readily crumples under compression, but which does not appreciably stretch under tension. As a result, the multi-link boot assembly of this advantageous embodiment can be bent until interior portions of adjacent links are brought into contact. Since the sleeve is fabricated of a material which does not appreciably stretch under tension, however, the sleeve prevents further bending of the boot assembly once the interior portions of adjacent links contact, thereby establishing the predetermined minimum bend radius beyond which the boot assembly cannot be bent.

The body portion of each link has a predetermined cross-sectional shape in a direction transverse to the lengthwise extending bore. For example, the predetermined cross-sectional shape of the body portion can be rectangular, circular or elliptical. According to one advantageous embodiment, each link has a generally rectangular cross-sectional shape such that the resulting flexible boot assembly preferentially bends in two orthogonal directions.

The body portion of each link also preferably has a predetermined wall thickness so that each link of the flexible boot assembly will maintain the predetermined minimum bend radius as an off-axial load is applied. In order to ensure that the flexible boot assembly will prevent the cable from bending beyond the predetermined minimum bend radius as large off-axial loads are applied to the cable, the links are preferably formed of a hard material, such as a hard thermoplastic material or a metal.

Therefore, the multi-link boot assembly of the present invention can be disposed adjacent one end of a connector which is mounted on the end portion of a cable, such as a fiber optic or electrical cable. Accordingly, the multi-link boot assembly of the present invention will permit the cable to readily bend or flex until the predetermined minimum bend radius is reached. Once the cable is bent by the predetermined minimum bend radius, the boot assembly of the present invention will prevent further bending of the cable even in instances in which increased off-axial loads are applied to the cable. As a result, the multi-link boot assembly of the present invention effectively disperses stresses along the cable as the cable is bent and prevents a concentration of the stresses at any point along the cable, including on those portions of the cable which extend from the rear portion of the connector. Thus, the multi-link boot assembly of the present invention allows a cable to be bent or flexed while preventing undesirable degradation of the cable as the cable is repeatedly flexed.

BRIEF DESCRIPTION OF THE DRAWINGS

FIG. 1 is a perspective view of a connector assembly including a connector and a multi-link boot assembly having a circular cross-sectional shape according to one embodiment of the present invention.

FIG. 1A is a cross-sectional view of the embodiment of connector assembly of FIG. 1 taken along line 1A—1A which illustrates the relative positions of the plurality of links in instances in which the cable is bent to the predetermined minimum bend radius.

FIG. 2 is an exploded perspective view of the embodiment of the connector assembly of FIG. 1 which illustrates the coupling of the plurality of links to the connector.

FIG. 3 is a perspective view of the connector of the embodiment of the connector assembly of FIG. 1 which illustrates the circumferential collar extending radially outward from the rear portion of the connector for engaging a link of the multi-link boot assembly.

FIG. 7A is a perspective view of a connector assembly according to yet another embodiment of the present invention which illustrates a multi-link boot assembly having a generally rectangular cross-sectional shape.

FIGS. 7B and 7C are front and side plan views of a portion of the connector assembly of FIG. 7A illustrating the connector and the first link.

FIG. 7D is a cross-sectional view of the portion of the embodiment of the connector assembly illustrated in FIGS. 7B and 7C and taken along line 7D—7D of FIG. 7B.

FIG. 8A is a perspective view of one link of the embodiment of the multi-link boot assembly illustrated in FIGS. 7A–7D.

DETAILED DESCRIPTION OF THE PREFERRED EMBODIMENT

Figure 4:
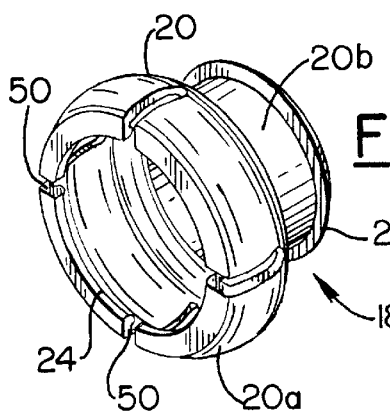
FIG. 4 is a perspective view of a link of the embodiment of the multi-link boot assembly of FIG. 1.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

According to the present invention, a connector assembly 10 is provided for dispersing stress along a cable 12, such as a fiber optic cable or an electrical cable. As a result, the connector assembly of the present invention significantly reduces the concentration of stresses on the cable, such as on the portion of the cable which extends from the rear portion 14a of a connector 14, which would tend to impair or limit the performance of the cable over time.

As shown in FIG. 1, a connector assembly 10 of the present invention generally includes a connector 14 and a multi-link boot assembly 16 adjacent one end of the connector. Typically, the connector is mounted on the end portion of a cable 12 in a conventional manner known to those skilled in the art. As shown in FIG. 1, the cable extends in a lengthwise direction through the multi-link boot assembly which permits flexing of the cable in response to off-axial loads but which prevents the cable from bending beyond a predetermined minimum bend radius. As a result, the connector assembly and, more particularly, the multi-link boot assembly of the present invention protects the cable from excessive bending in the vicinity of the connector and prevents a deleterious concentration of stress on the portion of the cable that extends from the rear portion 14a of the connector.

The multi-link boot assembly 16 of the present invention includes a plurality of separate links 18. Each link includes a body portion 20 which defines a lengthwise extending bore 21 through which the cable extends. According to one advantageous embodiment, the body portion of each link has a female section 20a at a first end and a male section 20b at an opposed second end. The female section defines an opening therein for receiving the male section of another link. As shown in cross section in FIG. 1A and by the arrows in FIG. 2, the plurality of separate links of this embodiment can be connected or coupled by inserting the male section of one link into the female section of another link in the manner described below in order to form a flexible boot assembly.

The multi-link boot assembly 16 of the present invention also includes an engagement member for operatively engaging the plurality of links 18. As described below, the plurality of links and the engagement member cooperate to limit the angular offset between adjacent links by providing a positive stop to prevent further relative angular motion once the adjacent links are offset by a predetermined angle. Accordingly, the multi-link boot assembly readily flexes until the predetermined minimum bend radius defined by the plurality of links and the engagement member is reached. Thereafter, the boot assembly resists further bending or flexing, even as increasing off-axial loads are applied thereto.

The engagement member of several advantageous embodiments of the multi-link boot assembly 16 includes a connecting element at each opposed end of each link 18. As a result, the plurality of links can be interconnected in order to form the flexible boot assembly. In the embodiment illustrated in FIGS. 1, 1A, 2 and 4, the connecting element of the male section 20b of one advantageous embodiment includes a circumferential collar 22. As shown, the circumferential collar extends radially outward from the male section to form a circumferential ring or rib. However, the circumferential collar need not extend about the entire circumference of the male section, but can, instead, about only a portion of the male section as shown in FIGS. 8A–8E. The circumferential collar is generally positioned adjacent the second end as shown in FIGS. 2 and 4. However, the circumferential collar can be spaced from the second end of the body portion without departing from the spirit and scope of the present invention.

Figure 8B:
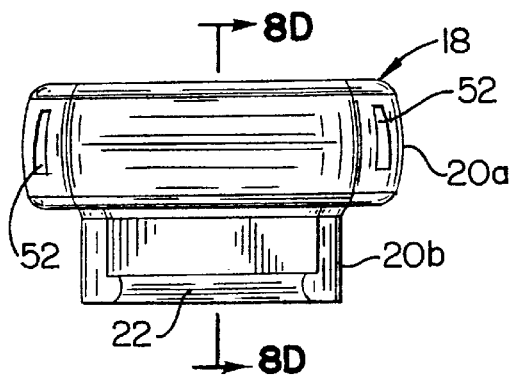
FIGS. 8B and 8C are front and side plan views of the link of the embodiment of the multi-link boot assembly shown in FIG. 8A.
Figure 8C:
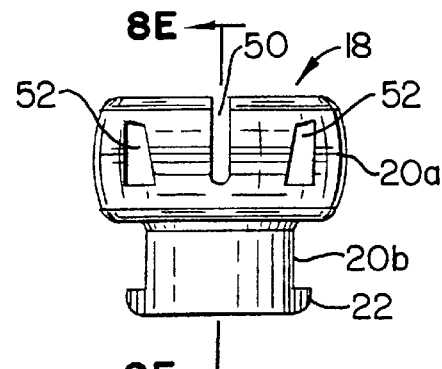
Figure 8D:
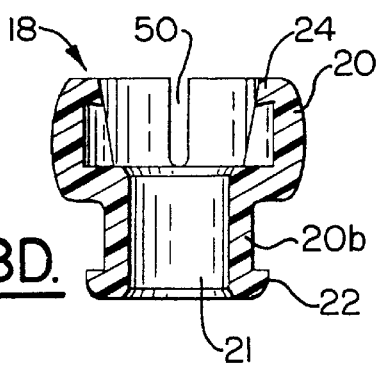
FIGS. 8D and 8E are cross-sectional views of the link of the embodiment of the multi-link boot assembly shown in FIGS. 8B and 8C and taken along lines 8D—8D and 8E—8E, respectively.
Figure 8E:
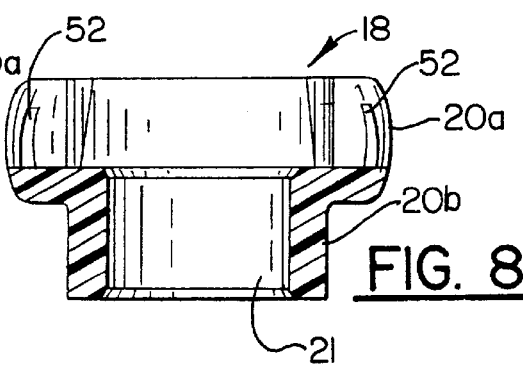

According to this advantageous embodiment, the connecting element of the female section 20a of each link 18 of the multi-link boot assembly 16 includes a circumferential lip 24. The circumferential lip extends at least partly into the opening defined by the female section. As shown in FIGS. 1A, 4 and 8D, the circumferential lip extends radially inward into the opening defined by the female section.

In order to assemble the multi-link boot assembly 16 of this embodiment of the present invention, the male section 20b of a first link is inserted into the female section 20a of a second link. In particular, the male section of the first link is inserted such that the circumferential collar 22 extending outwardly from the male section is received within the opening defined by the female section of the second link. Once assembled, the circumferential collar of the male section is disposed within the female section interior of the circumferential lip 24.

As described below, adjacent links 18 of the multi-link boot assembly 16 can be connected in a variety of fashions, including a snap-fit arrangement or by crimping the female section 20a of one link radially inward about the male section 20b of another link. In order to facilitate both the insertion of the male section of a first link into the female section of a second link and the retention of the male section of the first link within the female section of the second link regardless of the manner of connection, one or both of the circumferential collar 22 of the male section and the circumferential lip 24 of the female section are preferably tapered or sloped in a lengthwise direction. As shown in cross section in FIG. 1A, the circumferential collar is preferably tapered such that the height of the circumferential collar increases in a direction extending from the second end of link toward a medial portion of the link. Although not illustrated, the circumferential lip can also be tapered such that the height of the circumferential lip increases in a direction extending from the first end of link toward a medial portion of the link.

Once the male section 20b of the first link has been inserted within the female section 20a of the second link such that the circumferential collar 22 of the male section of the first link engages the circumferential lip 24 of the female section of the second link, the first and second links are coupled together. As shown in FIGS. 1 and 1A, however, adjacent links 18 of the multi-link boot assembly 16 of the present invention can move relative to one another in order to permit the cable 12 to flex or bend. The range of motion permitted between adjacent links of the multi-link boot assembly is limited, however, by the relative lengths of the male and female sections of the adjacent links since the engagement of the circumferential collar of a first link by the circumferential lip of a second link prohibits or prevents further bending of the cable.

According to the present invention, the plurality of links 18 and the engagement member cooperate to provide a positive stop to prevent further relative angular motion between adjacent links once the adjacent links are offset by a predetermined angle. In order to provide a positive stop, the plurality of links and the engagement member must provide at least two positive engagement points since adjacent links could continue to be angularly offset if only a single positive engagement point were provided. With respect to the embodiment illustrated in FIGS. 1 and 1A, the two positive engagement points are created along the inside and outside of the bent boot assembly by the abutment of adjacent links and by the positive engagement of the circumferential lip 24 of one link with the circumferential collar 22 of an adjacent link, respectively.

Preferably, the respective sizes or lengths of the male and female sections of the plurality of links 18 are selected such that the multi-link boot assembly 16 permits the cable 12 to be bent to a predetermined minimum bend radius. Once the cable has been bent to the predetermined minimum bend radius, however, the plurality of links and the engagement member cooperate to provide a positive stop to prevent further bending of the cable, thereby protecting the cable from damage as described above.

According to this advantageous embodiment of the present invention, the connector 14 also includes a connecting element for attaching the multi-link boot assembly 16 to a rear portion 14a of the connector. As shown in FIGS. 2, 3, 5 and 7A–7D, a connector according to this embodiment also preferably includes a circumferential collar 26 extending radially outward from the rear portion of the connector. Accordingly, the link 18 of the multi-link boot assembly disposed immediately adjacent the connector can be coupled to the connector in the same manner to that described above in conjunction with adjacent links. In particular, the rear portion of the connector including the circumferential collar is inserted within the female section 20a of the adjacent link such that the circumferential collar is received within the female section and as disposed interior of the circumferential lip 24 of the adjacent link such that the circumferential lip engages the circumferential collar of the connector, thereby coupling the connector and the adjacent link.

Although links 18 having one advantageous type of connecting element is described above in conjunction with FIGS. 1–5, the links of the multi-link boot assembly 16 of the present invention can include other types of connecting elements without departing from the spirit and scope of the present invention. For example, the male section 20b of each link of another embodiment can define a circumferential groove for receiving the circumferential lip 24 of the female section 20a of an adjacent link. Alternatively, the female section of each link can define a circumferential groove which opens inwardly into the bore 21 for receiving the circumferential collar 22 of an adjacent link. According to either embodiment, however, the adjacent links are connected or coupled to form a multi-link boot assembly according to the present invention.

The links 18 of the multi-link book assembly 16 of the present invention can include still other types of connecting elements without departing from the spirit and scope of the present invention. For example, the multi-link boot assembly illustrated in FIGS. 6A–6D includes a plurality of links having a connecting element formed of at least one arm 30 extending outwardly from one end of each link. Preferably, each link includes a pair of arms extending outward, typically in a lengthwise direction, from one end of each link. As shown, the arms preferably extend outwardly from opposite sides of the link so as to couple adjacent links of the multi-link boot assembly in a manner which permits controlled relative movement between the links, thereby allowing the cable 12 to flex until the predetermined minimum bend radius is reached.

Figure 6A:
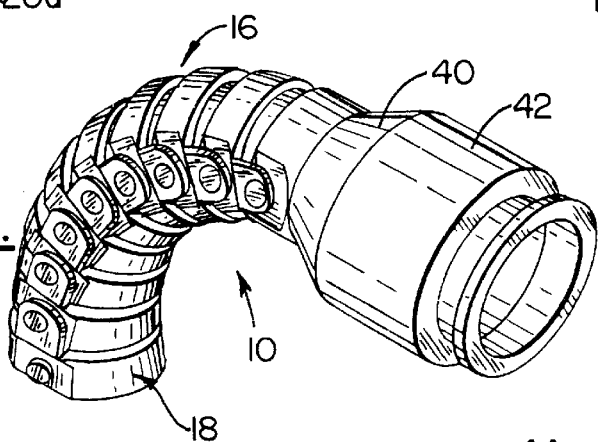
FIG. 6A is a perspective view of another embodiment of a connector assembly according to the present invention.

Each link 18 of this embodiment of the multi-link boot assembly 16 also preferably includes at least one outwardly extending post 32 adjacent the other end of the link. As shown, each link preferably includes a pair of posts extending radially outward from opposite sides of the link. As a result, the pair of arms 30 of a first link can engage the pair of posts of a second link in order to couple the links and to form at least a portion of the flexible boot assembly of the present invention. In particular, the outwardly extending arms also preferably define respective apertures 34 sized and shaped to match the outwardly extending posts of another link, as shown in FIGS. 6A and 6B. Thus, the pair of arms of a first link can engage the pair of posts of a second link such that the posts extend through the aperture defined by the respective arm, thereby coupling or connecting the links.

Figure 6C:
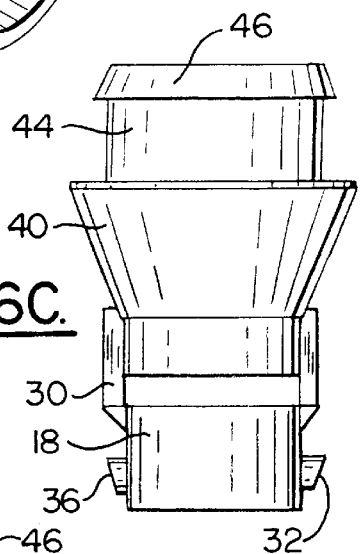
FIGS. 6B and 6C are side and front plan views of a portion of the embodiment of the connector assembly illustrated in FIG. 6A.
Figure 6B:
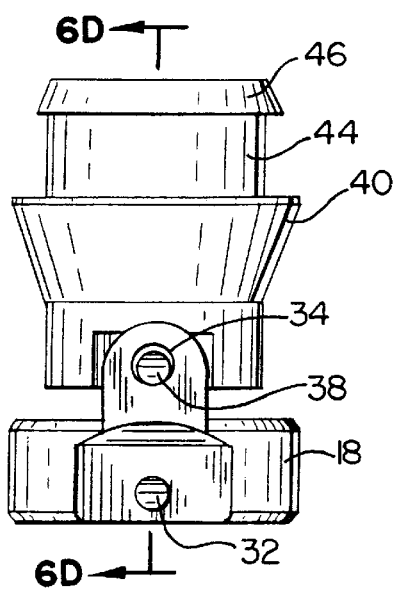
Figure 6D:
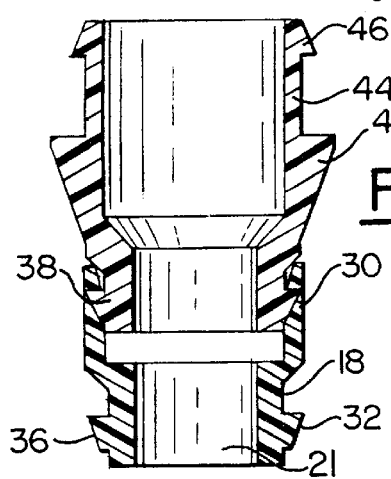
FIG. 6D is a cross-sectional view of the portion of the embodiment of the connector assembly shown in FIGS. 6B and 6C and taken along line 6D—6D of FIG. 6B.

As shown in FIGS. 6C and 6D, the posts 32 preferably have a beveled end portion 36 that is sloped in a lengthwise direction such that the interiormost portion of the posts has a greater height than the exteriormost portion of the posts. In addition, the spacing between the arms 30 is generally less than the spacing between the end portions of the posts. However, the outwardly extending arms are preferably sufficiently resilient to flex outward as the arms of a first link are slid over and snapped onto the posts of an adjacent link such that the links 18 can be coupled to form a portion of the multi-link boot assembly 16 of the present invention.

As shown in FIGS. 6A–6D, the rear portion 14a of the connector 14 of this advantageous embodiment also preferably includes at least one and, more typically, a pair of posts 38 extending radially outward from opposite sides of the rear portion of the connector. As a result, the link 18 of the multi-link boot assembly 16 disposed immediately adjacent the connector can be coupled to the connector by engaging the posts extending outwardly from the rear portion of the connector with respective ones of the outwardly extending arms of the link.

As shown in FIG. 6A, the multi-link boot assembly 16 of this embodiment of the present invention also permits the cable 12 to be flexed, but prevents flexure of the cable beyond the predetermined minimum bend radius. As described above, the plurality of links 18 and the engagement member of this embodiment also cooperate to provide a positive stop to further relative angular motion of adjacent links once the adjacent links are offset by a predetermined angle. In particular, the plurality of links and the engagement member of the embodiment of FIGS. 6A–6D creates two positive engagement points along the inside and outside of the bent boot assembly by the abutment of adjacent links and by positive engagement of the outwardly extending post 32 of one link with the corresponding aperture 34 of an adjacent link, respectively.

As a result of the mechanical interconnection of the plurality of links 18, the multi-link boot assembly 16 of this embodiment of the present invention only permits the cable to be flexed or bent in two directions. Accordingly, the multi-link boot assembly of this embodiment is particularly advantageous for use with connectors 14 mounted within a patch panel or other enclosed structures. In particular, the multi-link boot assembly of this embodiment can be disposed within the patch panel or other enclosed structure so as to prevent the cable 12 from sagging downwardly and interfering or obstructing other connectors or other fiber optic cables.

In order to permit flexure of the cable 12 in other directions, however, the connector 14 can be formed of at least two elements which permit relative movement therebetween. According to this embodiment, the connector includes a rear portion 40 and a forward portion 42. As shown in FIGS. 6A–6D, the rear portion of the connector has a generally circular cross-sectional shape and includes a male portion 44 having a reduced diameter at a first end, opposite the multi-link boot assembly 16. The male portion of the rear portion of the connector also includes a circumferential collar or rim 46 which extends radially outward and may be tapered in a lengthwise direction as shown in FIGS. 6B–6D.

The forward portion 42 of the connector 14 of this embodiment defines an internal opening sized and shaped to receive the reduced diameter male portion 44 of the rear portion 40 of the connector. The forward portion of the connector of this embodiment also includes a circumferential lip or rim which extends radially inward into the opening for engaging the circumferential collar 46 of the rear portion as the rear portion is inserted into the opening defined by the forward portion, thereby coupling the forward and rear portions of the connector. Once coupled, the rear portion of the connector can rotate relative to the forward portion. Thus, even though the multi-link boot assembly 16 of this embodiment of the present invention can only bend in two directions, the rotation of the rear portion of the connector relative to the forward portion permits the multi-link boot assembly, and in turn, the cable 12 to bend in any desired direction. While one embodiment of a two-part connector is described above, the connector can be formed in other fashions and the forward and rear portions can be coupled in other manners as that departing from the spirit and scope of the present invention.

Figure 9:
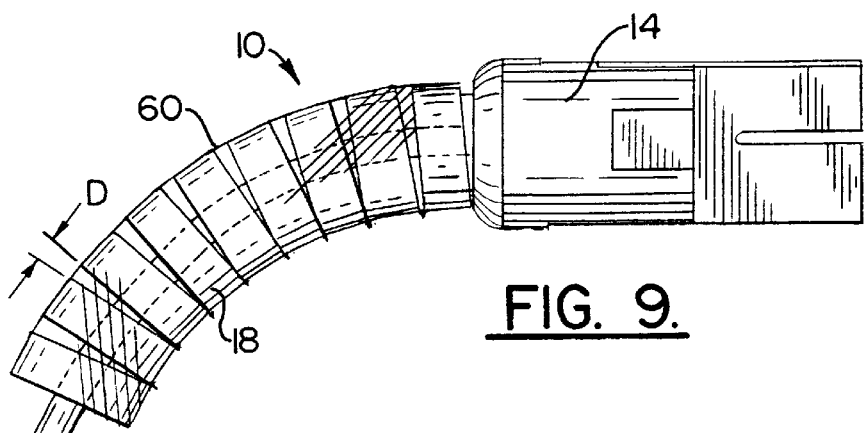
FIG. 9 is a side view of a multi-link boot assembly of another embodiment of the present invention which includes a plurality of links disposed within a sleeve wherein a portion of the sleeve has been broken away for purposes of illustration.
Figure 9A:
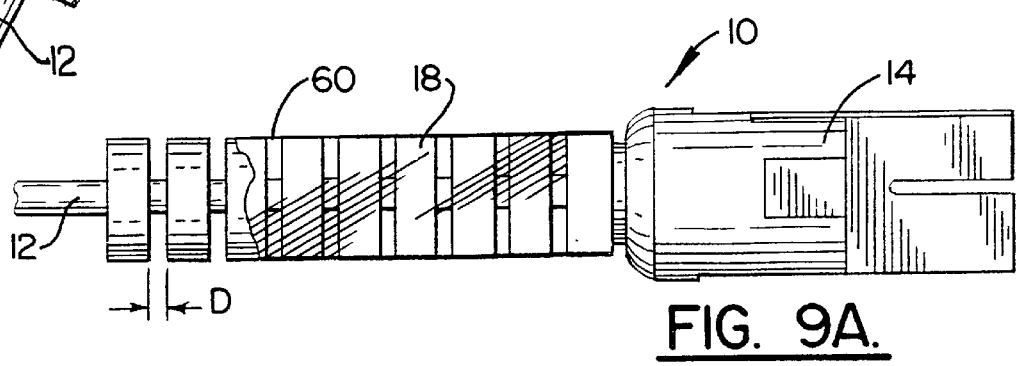
FIG. 9A is another side view of the multi-link boot assembly of FIG. 9 in which the boot assembly has been bent to the predetermined minimum bend radius to depict the contact between adjacent links which are illustrated within the sleeve.

As shown in FIGS. 9 and 9A, the engagement member of another advantageous embodiment includes a sleeve 60 which holds the plurality of separate links 18 in a predetermined serial order. In one embodiment, the links are attached to the sleeve, such as with an adhesive, such that the links remain in the same predetermined serial order within the sleeve. In addition, the links are preferably spaced apart within the sleeve by a predetermined spacing D which defines, at least in part, the predetermined minimum bend radius of the resulting boot assembly 16.

The sleeve 60 is preferably fabricated of a material which readily crumples under compression, but which does not appreciably stretch under tension. For example, the sleeve can be fabricated of a thermoset plastic material, such as extruded mylar tape which does not appreciably stretch under tension. As a result, the multi-link boot assembly 16 of this advantageous embodiment can be bent until interior portions of adjacent links 18 are brought into contact which provides a first point of positive engagement. Since the sleeve is fabricated of a material which does not appreciably stretch under tension, however, the sleeve maintains the predetermined spacing D between adjacent links and provides the second point of positive engagement. As a result, the multi-link boot assembly of this embodiment also provides a positive stop to prevent further bending of the boot assembly once the interior portions of adjacent links contact, thereby establishing the predetermined minimum bend.

As shown in FIGS. 9 and 9A, the link 18 adjacent the connector 14 is preferably connected to a rear portion of the connector, such as in any of the various manners described above in conjunction with the other embodiments of the present invention. Although not illustrated, the multi-link boot assembly 16 of FIGS. 9 and 9A can include links having different outer diameters. As a result, the boot assembly, including the sleeve 60, can be tapered in a lengthwise direction if desired. In addition, the predetermined spacing between the links can be varied along the length of the boot assembly. Once the spacing has been set, however, the links are preferably adhered to the sleeve in order to prevent relative motion therebetween.

Figure 5:
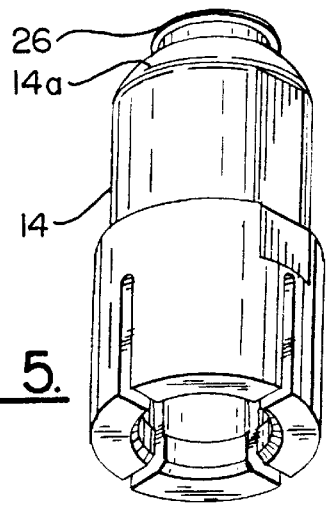
FIG. 5 is a perspective view of another connector having a circular cross-sectional shape and including a circumferential collar extending radially outward from the rear end of the connector for engaging a link of the multi-link boot assembly.

As shown in FIGS. 3, 5 and 6A, the connector 14 can have a variety of cross-sectional shapes without departing from the spirit and scope of the present invention. For example, the connector can have a rectangular or square cross-sectional shape or a circular or elliptical cross-sectional shape. Likewise, each link 18 of the multi-link boot assembly 16 of the present invention can have a number of different cross-sectional shapes, such as circular, rectangular or square, without departing from the spirit and scope of the present invention.

With respect to the multi-link boot assembly 16 having a plurality of links 18 with a circular cross-sectional shape, the multi-link boot assembly will bend equally in every direction. In other words, the multi-link boot assembly of this embodiment will bend in equal amounts with equal resistance in every direction. With respect to a multi-link boot assembly having a plurality of links having a generally rectangular cross-sectional shape, such as illustrated in FIGS. 7A–7D and 8A–8E, the multi-link boot assembly will preferentially bend in two directions. More particularly, the multi-link boot assembly of this embodiment will preferentially bend in the two directions generally aligned with, i.e., parallel with, the sidewalls of the body portion 20 of the rectangular links of the multi-link boot assembly. Since the sidewalls have different lengths, the multi-link boot assembly of this embodiment will generally permit the cable 12 to bend to a greater degree in a direction generally aligned with, i.e., parallel with, the shorter sides of the links than in a direction aligned with, i.e., parallel with, the longer sides of the links.

A multi-link boot assembly 16 having a plurality of rectangular links 18 is particularly advantageous for use with a ribbon cable 12. As known to those skilled in the art, a ribbon cable includes a plurality of optical fibers disposed in a side-by-side manner to thereby define a reference plane. As also known to those skilled in the art, a ribbon cable is preferably bent or flexed from side-to-side within the reference plane to a much lesser degree than in a direction perpendicular to the reference plane. Accordingly, the multi-link boot assembly having a plurality of rectangular links will advantageously permit the ribbon cable to be bent to a much greater in the direction perpendicular to the reference plane than in a side-to-side manner within the reference plane.

Regardless of the particular configuration of the connector 14 and the plurality of links 18 of the multi-link boot assembly 16, the links can be assembled in a variety of fashions without departing from the spirit and scope of the present invention. For example, adjacent links can be positioned such that the male section 20b of a first link is inserted within the female section 20a of a second link. Thereafter, the female section can be crimped radially inward about the male section of the first link such that the circumferential collar 22 extending outwardly from the male section of the first link is disposed interior of and operatively engages the circumferential lip 24 of the female section of the second link. Alternatively, the links can be formed of a somewhat resilient material such that the links can be connected in a snap-fit manner. According to either embodiment, however, the female section of each link preferably includes at least one cut-out 50 which opens through the first end. As a result, the female section can be deformed, such as during either a crimping or snap-fit operation, for mating with the male section of another link.

Each link 18 is preferably made of a relatively hard material such that the link will maintain the predetermined bend radius under an off-axial load and will not permit the cable 12 to flex beyond the predetermined minimum bend radius even as increasing amounts of off-axial loads are applied. For example, each link of the multi-link boot assembly 16 can be formed of a hard thermoplastic material, such as ULTEM™ material, or a metal such as aluminum. While each link of the multi-link boot assembly can be formed in a variety of fashions without departing from the spirit and scope of the present invention, each link is preferably machined, such as by a CNC mill, a CNC screw machine and a CNC lathe. As shown in FIGS. 8A and 8C, each link can be formed to define one or more windows 52 which open into the lengthwise extending bore 21 in order to reduce material costs. In order to further ensure that the multi-link boot assembly of the present invention will not permit the cable to bend beyond the predetermined minimum bend radius as the cable is subjected to an off-axial load, the body portion 20 of each link preferably has a predetermined wall thickness. While the predetermined wall thickness of one advantageous embodiment is between about 1 mm and about 3 mm, the links can be designed to have many other predetermined wall thickness based upon the diameter of the cable 12, the minimum bend radius and the maximum anticipated off-axis load.

Therefore, the multi-link boot assembly 16 of the present invention can be disposed adjacent one end of a connector 14 which is mounted on the end portion of a cable 12, such as a fiber optic or electrical cable. As described above, the multi-link boot assembly of the present invention will permit the cable to readily bend or flex until the predetermined minimum bend radius of the cable is reached. Once the cable is bent by the predetermined minimum bend radius, the boot assembly of the present invention will prevent further bending of the cable even in instances in which increased off-axial loads are applied to the cable. As a result, the multi-link boot assembly of the present invention effectively disperses stresses along the cable as the cable is bent and prevents a concentration of the stresses at any point along the cable, including on that portion of the cable which extends from the rear portion 14a of the connector. Thus, the multi-link boot assembly of the present invention allows a cable to be bent or flexed, such as during or following installation, while preventing undesirable degradation of the cable as the cable is bent.

Many modifications and other embodiments of the invention will come to the mind of one skilled in the art to which this invention pertains having the benefit of the teachings presented in the foregoing written description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A multi-link boot assembly for a cable connector comprising:

a plurality of individual rigid links, each rigid link having a first end, a second end, and a bore therethrough for receiving a cable;

an engagement member extending from at least a portion of each link at the first end, and a receiving member extending from at least a portion of each link at the second end, the engagement member configured to engage the receiving member at the second end of an adjacent rigid link, whereby the engagement member and receiving member limit angular offset between adjacent links by providing a positive stop to prevent further relative angular motion once the adjacent links are offset by a predetermined angle to thereby form a flexible boot assembly capable of maintaining a predetermined minimum bend radius under an off-axial load.

2. The multi-link boot assembly according to claim 1 wherein the engagement member at the first end of each link includes a male section and the receiving member at the second end of each link includes a female section, the male section of a first rigid link receiving the female section of another rigid link to secure the first link to the other link.

3. The multi-link boot assembly according to claim 2 wherein the male section of the engagement member comprises a circumferential collar extending outwardly from the first end and the female section of the receiving portion comprises a circumferential lip portion.

4. The multi-link boot assembly according to claim 3 wherein the female section further comprises at least one cut-out opening through the second end, thereby allowing the female member section to deform for mating with a male section of another rigid link.

5. The multi-link boot assembly according to claim 1 wherein the engagement member comprises at least one arm extending outwardly from one end of each link and the receiving portion comprises at least one outwardly extending post adjacent the other end of each link, wherein the at least one arm of a first link is adapted to engage a respective arm of a second link to thereby connect the first and second links to form at least a portion of the flexible boot assembly.

6. The multi-link boot assembly according to claim 1 wherein each link has a predetermined shape in cross-section transverse to the bore, and wherein the predetermined cross-sectional shape is selected from the group consisting of rectangular, circular, and elliptical.

7. The multi-link boot assembly according to claim 1 wherein the boot assembly is connected to the cable connector in a rotatable manner.

8. A multi-link boot assembly according to claim 1 wherein each link has a substantially rectangular cross-sectional shape such that the resulting flexible boot assembly preferentially bends in two orthogonal directions.

9. A multi-link boot assembly according to claim 1 wherein the links are made of a hard material selected from the group consisting essentially of a hard thermoplastic or a metal so that said body portion will maintain the predetermined minimum bend radius under an off-axial load.

10. A link of a multi-link boot assembly for a cable connector, the link comprising:
   a body portion extending between a first and second opposed ends and defining a bore therethrough;
   an engagement member extending from a portion of the first end of the body portion;
   a receiving member extending from a portion of the second end of the body portion, the receiving member configured to receive an engagement member of another link thereby limiting angular offset between adjacent links by providing a positive stop to prevent further relative angular motion once the adjacent links are offset by a predetermined angle to thereby form a flexible boot assembly capable of maintaining a predetermined minimum bend radius under an off-axial load.

11. The link according to claim 1, wherein the engagement member of the body portion includes a male section and the receiving member of the body portion includes a female section, the male section of a first rigid link receiving the female section of another rigid link to fixedly secure the first link with the other link.

12. The link according to claim 11 wherein the male section of the engagement member comprises a circumferential collar extending outwardly from the first end and the female section of the receiving portion comprises a circumferential lip portion.

13. The link according to claim 11 wherein the female section further comprises at least one cut-out opening through the second end, thereby allowing the female member section to deform for mating with the male section of another rigid link.

14. A multi-link boot assembly for a cable connector comprising:
   a plurality of individual rigid links, each rigid link having a first end, a second end, an outer surface, and a bore therethrough for receiving a cable;
   an engagement sleeve attached only to the outer surface of each link, whereby the engagement sleeve on each link and adjacent rigid links cooperate to limit angular offset between the adjacent links by providing a positive stop to prevent further relative angular motion once the adjacent links are offset by a predetermined angle to thereby form a flexible boot assembly capable of maintaining a predetermined minimum bend radius under an off-axial load.

15. The multi-link boot assembly of claim 14 wherein the rigid links are attached to the cable at a predetermined spacing.

16. The multi-link boot assembly of claim 14 wherein the engagement sleeve is made of a thermoset plastic material.

17. The multi-link boot assembly of claim 15 wherein the rigid links are disposed along the cable in a predetermined order and have a decreasing diameter from one end of the assembly to another end.

* * * * *